(12) United States Patent
Wu

(10) Patent No.: US 11,711,333 B2
(45) Date of Patent: Jul. 25, 2023

(54) BULLET COMMENT PROCESSING METHOD AND SYSTEM BASED ON WECHAT APPLET

(71) Applicant: SHANGHAI BILIBILI TECHNOLOGY CO., LTD., Shanghai (CN)

(72) Inventor: Xiuran Wu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/779,534

(22) PCT Filed: Mar. 26, 2020

(86) PCT No.: PCT/CN2020/081494
§ 371 (c)(1),
(2) Date: May 24, 2022

(87) PCT Pub. No.: WO2021/103365
PCT Pub. Date: Jun. 3, 2021

(65) Prior Publication Data
US 2023/0037528 A1 Feb. 9, 2023

(30) Foreign Application Priority Data
Nov. 25, 2019 (CN) .......................... 201911168313.7

(51) Int. Cl.
*H04L 51/234* (2022.01)
*H04L 51/216* (2022.01)
*H04L 51/226* (2022.01)

(52) U.S. Cl.
CPC .......... *H04L 51/234* (2022.05); *H04L 51/216* (2022.05); *H04L 51/226* (2022.05)

(58) Field of Classification Search
CPC ... H04L 51/234; H04L 51/216; H04L 51/226; H04L 12/58; H04L 51/046; H04L 51/066; H04L 51/52; H04L 67/02; H04N 21/2254
See application file for complete search history.

(56) References Cited

U.S. PATENT DOCUMENTS 10,708,215 B2 * 7/2020 Xu .......................... H04L 67/01
2013/0262168 A1 * 10/2013 Makanawala ........ G06Q 30/016
705/7.14
(Continued)

FOREIGN PATENT DOCUMENTS

| CN | 104936035 A | 9/2015 |
| CN | 104967896 A | 10/2015 |

(Continued)

OTHER PUBLICATIONS

International Patent Application No. PCT/CN2020/081494; Int'l Search Report; dated Aug. 31, 2020; 2 pages.
(Continued)

*Primary Examiner* — Sargon N Nano
(74) *Attorney, Agent, or Firm* — BakerHostetler

(57) ABSTRACT

The present disclosure describes techniques of processing bullet comments. The techniques comprise obtaining a page of playing a video to output a video stream; obtaining a plurality of pieces of bullet comment data associated with the video stream; and performing an $i^{th}$ bullet comment processing operation comprising adjusting operation indication information to a first piece of indication information; traversing the plurality of pieces of bullet comment data and determining whether the plurality of bullet comment data comprise a piece of bullet comment data in a to-be-posted state; performing a processing operation on the piece of bullet comment data in the to-be-posted state; in response to determining that the processing operation on the piece of bullet comment data in the to-be-posted state has been (Continued)

completed, adjusting the operation indication information to a second piece of indication information. In the present application, the operation indication information is configured to perform or block an operation subsequent to a bullet comment processing operation.

19 Claims, 6 Drawing Sheets

(56) References Cited

U.S. PATENT DOCUMENTS

| | | | |
|---|---|---|---|
| 2014/0047358 A1* | 2/2014 | Park | H04L 51/04 |
| | | | 715/758 |
| 2017/0163580 A1* | 6/2017 | Zhang | H04L 51/214 |
| 2017/0169039 A1* | 6/2017 | Brown | H04N 21/475 |
| 2017/0264585 A1* | 9/2017 | Xu | H04L 51/52 |
| 2018/0152767 A1* | 5/2018 | Liu | H04N 21/4781 |
| 2019/0044898 A1* | 2/2019 | Shioya | H04L 51/10 |
| 2019/0179852 A1* | 6/2019 | Fei | G06V 20/41 |
| 2019/0215557 A1 | 7/2019 | You et al. | |
| 2020/0007940 A1* | 1/2020 | Li | H04N 21/8545 |
| 2020/0213686 A1* | 7/2020 | Li | H04N 21/44 |
| 2020/0260137 A1* | 8/2020 | Chen | H04N 21/47217 |
| 2021/0279888 A1* | 9/2021 | Luo | G06V 10/34 |

FOREIGN PATENT DOCUMENTS

| | | |
|---|---|---|
| CN | 105828164 A | 8/2016 |
| CN | 106131643 A | 11/2016 |
| CN | 106209580 A | 12/2016 |
| CN | 106454485 A | 2/2017 |
| CN | 106658204 A | 5/2017 |
| CN | 107770563 A | 3/2018 |
| CN | 108024121 A | 5/2018 |
| CN | 108696766 A | 10/2018 |
| CN | 108810645 A | 11/2018 |
| CN | 109062650 A | 12/2018 |
| CN | 109640154 A | 4/2019 |
| CN | 110069620 A | 7/2019 |

OTHER PUBLICATIONS

"Mini Program View Layer (xx.xml) and Logic Layer (xx.js)"; https://www.cnblogs.com/wpbars/p/5955035.html; Frontend Blog; ©2022; accessed May 23, 2022; 13 pages.

"WeChat applet_(logic layer,view layer, configuration filed)"; https://www.jianshu.com/p/eff8858cbc91; Oct. 2016; accessed May 24, 2022; 18 pages.

* cited by examiner

BULLET COMMENT PROCESSING METHOD AND SYSTEM BASED ON WECHAT APPLET

CROSS-REFERENCE TO RELATED APPLICATION

The present application is the U.S. National Stage of International Application No. PCT/CN2020/081494, filed on Mar. 26, 2020, which claims priority of the Chinese Patent Application No. 201911168313.7, filed on Nov. 25, 2019, and entitled "Method and system for processing bullet comment", both of which are incorporated herein by reference in their entireties.

TECHNICAL FIELD

Embodiments of the present application relate to the field of computers, and in particular to a WeChat mini program based bullet comment processing method, a system, a computer device, and a computer-readable storage medium.

BACKGROUND

Bullet comments refer to comments in the form of words, emojis, patterns, etc. presented simultaneously when a video is played. At present, bullet comments have become an important element for many viewers to watch videos and live broadcasts. Bullet comments enable users to express their feelings upon watching programs, and read comments on the programs from other users as well, thus implementing interaction when the users watch videos.

In developing of a WeChat mini program, as in conventional page development, the computer language used is JavaScript. The two development processes bear many similarities, but have some differences due to different running kernels. For example, for a WeChat mini program, a render layer and a logical layer are separate without affecting each other. The inventor found that due to asynchrony between the render layer and the logical layer, unpredictable bugs often occur in a process of displaying a bullet comment, causing faults in displaying and affecting experience of bullet comment displaying.

SUMMARY

In view of this, an objective of the embodiments of the present application is to provide a WeChat mini program based bullet comment processing method, a system, a computer device, and a computer-readable storage medium, to solve the technical problem that unpredictable bugs are prone to occur in a process of displaying a bullet comment due to asynchrony of a logical layer and a view layer in a WeChat mini program.

An aspect of the embodiments of the present application provides WeChat mini program based bullet comment processing method, the method including: obtaining a video playback page for outputting a video stream; obtaining a plurality of bullet comment data associated with the video stream; and performing an $i^{th}$ bullet comment processing operation: adjusting an operation indication information to a first indication information, where the first indication information is used to indicate that an operation subsequent to the $i^{th}$ bullet comment processing operation is prevented from performing; traversing the plurality of bullet comment data, to query whether the plurality of bullet comment data include bullet comment data in a to-be-posted state; and if the plurality of bullet comment data include the bullet comment data in the to-be-posted state: performing a processing operation for the bullet comment data in the to-be-posted state; determining whether the processing operation for the bullet comment data in the to-be-posted state has been completed; and if the processing operation for the bullet comment data in the to-be-posted state has been completed, adjusting the operation indication information to a second indication information, where the second indication information is used to indicate that the operation subsequent to the $i^{th}$ bullet comment processing operation is allowed to be performed.

Optionally, performing a processing operation for the bullet comment data in the to-be-posted state includes: adding the bullet comment data in the to-be-posted state to a queue of to-be-posted bullet comments, and notifying the view layer to perform a data update operation, to perform a first rendering operation according to the bullet comment data in the to-be-posted state; obtaining a bullet comment width of a bullet comment element resulting from the first rendering operation; determining, according to the bullet comment width of the bullet comment element, whether a bullet comment track in an idle state is comprised in a plurality of bullet comment tracks; and if a bullet comment track in the idle state is comprised in the plurality of bullet comment tracks, notifying the view layer to perform a data update operation to perform a second rendering operation, where a bullet comment element resulting from the second rendering operation is used for bullet comment display.

Optionally, determining, according to the bullet comment width of the bullet comment element, whether a bullet comment track in an idle state is comprised in a plurality of bullet comment tracks includes: determining whether a $k^{th}$ bullet comment track is empty, where k is a positive integer starting from 1; if the $k^{th}$ bullet comment track is empty, determining that the $k^{th}$ bullet comment track is in a idle state; if the $k^{th}$ bullet comment track is not empty, calculating a bullet comment speed of the bullet comment element according to the bullet comment width of the bullet comment element; determining, according to the bullet comment speed and bullet comment posting time of the bullet comment element, whether bullet comment content of the bullet comment element collides with the other bullet comment content in the $k^{th}$ bullet comment track; and if the bullet comment content of the bullet comment element does not collide with the other bullet comment content in the $k^{th}$ bullet comment track, determining that the $k^{th}$ bullet comment track is in the idle state; and if the bullet comment content of the bullet comment element collides with the other bullet comment content in the $k^{th}$ bullet comment track, determining that the $k^{th}$ bullet comment track is in a congested state.

Optionally, the operation subsequent to the $i^{th}$ bullet comment processing operation includes: an $(i+1)^{th}$ bullet comment processing operation, or an event processing operation based on a user event.

Optionally, the method further includes: detecting the operation indication information if the user event is received; and performing the event processing operation for the user event if it is detected that the operation indication information is the second indication information.

Optionally, the method further includes: detecting the operation indication information at a predetermined time interval if it is detected that the operation indication information is the first indication information, until it is detected that the operation indication information is adjusted to the second indication information.

Optionally, the method further includes: if the plurality of bullet comment data do not include the bullet comment data in the to-be-posted state, adjusting the operation indication information to a second indication information.

An aspect of the embodiments of the present application further provides a WeChat mini program based bullet comment processing system, the WeChat mini program based bullet comment processing system including: a first obtaining module to obtain a video playback page for outputting a video stream; a second obtaining module to obtain a plurality of bullet comment data associated with the video stream; and a bullet comment processing module to perform an $i^{th}$ bullet comment processing operation: adjusting an operation indication information to a first indication information, where the first indication information is used to indicate that an operation subsequent to the $i^{th}$ bullet comment processing operation is prevented from performing; traversing the plurality of bullet comment data, to query whether the plurality of bullet comment data include bullet comment data in a to-be-posted state; and if the plurality of bullet comment data include the bullet comment data in the to-be-posted state: performing a processing operation for the bullet comment data in the to-be-posted state; determining whether the processing operation performed for the bullet comment data in the to-be-posted state has been completed; and if the processing operation performed for the bullet comment data in the to-be-posted state has been completed, adjusting the operation indication information to a second indication information, where the second indication information is used to indicate that the operation subsequent to the $i^{th}$ bullet comment processing operation is allowed to be performed.

An aspect of the embodiments of the present application further provides a computer device, the computer device including a memory, a processor, and computer-readable instructions stored on the memory and executable by the processor, upon executing the computer-readable instructions, the processor is used to implement the following steps: obtaining a video playback page for outputting a video stream; obtaining a plurality of bullet comment data associated with the video stream; and performing an $i^{th}$ bullet comment processing operation: adjusting an operation indication information to a first indication information, where the first indication information is used to indicate that an operation subsequent to the $i^{th}$ bullet comment processing operation is prevented from performing; traversing the plurality of bullet comment data, to query whether the plurality of bullet comment data comprises bullet comment data in a to-be-posted state; and if the plurality of bullet comment data comprises the bullet comment data in the to-be-posted state: performing a processing operation for the bullet comment data in the to-be-posted state; determining whether the processing operation performed for the bullet comment data in the to-be-posted state has been completed; and if the processing operation performed for the bullet comment data in the to-be-posted state has been completed, adjusting the operation indication information to a second indication information, where the second indication information is used to indicate that the operation subsequent to the $i^{th}$ bullet comment processing operation is allowed to be performed.

An aspect of the embodiments of the present application further provides a computer-readable storage medium having computer-readable instructions stored therein, where the computer-readable instructions is executable by at least one processor, to cause the at least one processor to perform the following steps: obtaining a video playback page for a video stream; obtaining a plurality of bullet comment data associated with the video stream; and performing an $i^{th}$ bullet comment processing operation: adjusting an operation indication information to a first indication information, where the first indication information is used to indicate that an operation subsequent to the $i^{th}$ bullet comment processing operation is prevented from performing; traversing the plurality of bullet comment data, to query whether the plurality of bullet comment data comprises bullet comment data in a to-be-posted state; and if the plurality of bullet comment data comprises the bullet comment data in the to-be-posted state: performing a processing operation for the bullet comment data in the to-be-posted state; determining whether the processing operation performed for the bullet comment data in the to-be-posted state has been completed; and if the processing operation performed for the bullet comment data in the to-be-posted state has been completed, adjusting the operation indication information to a second indication information, where the second indication information is used to indicate that the operation subsequent to the $i^{th}$ bullet comment processing operation is allowed to be performed.

According to a WeChat mini program based bullet comment processing method, a system, the device, and the computer-readable storage medium provided in the embodiments of the present application a block mechanism of simulating single-thread is provided. Operation indication information is used for performing or blocking an operation subsequent to a bullet comment processing operation, to ensure that each bullet comment processing operation is performed after a previous bullet comment processing operation has been completed, and the former bullet comment processing operation is not affected by the latter bullet comment processing operation, thereby avoiding unpredictable bugs.

DETAILED DESCRIPTION OF EMBODIMENTS

In order to make the objectives, technical solutions, and advantages of the present application clearer, the present application will be described in further detail below in conjunction with the accompanying drawings and embodiments. It should be understood that the specific embodiments described here are merely intended to explain the present application, but are not intended to limit the present application. All other embodiments obtained by those of ordinary skill in the art based on the embodiments of the present application without creative efforts shall fall within the scope of protection of the present application.

The inventor has found that the WeChat mini program, as in common web page (HTML) development, uses the computer language JavaScript. The two development processes bear many similarities, but have some differences due to different running kernels. For example:

1. In common web page development, execution of a render thread and execution of a JavaScript thread are mutually exclusive, and when the render thread is being used, the JavaScript thread is blocked. However, a render layer and a logical layer of a WeChat mini program are separate and do not affect each other.

2. In the common web page development, a DOM API and a BOM API provided by a browser may be used to perform DOM selection and operation. However, because the logical layer and the render layer are separate in the WeChat mini program, and there is no complete browser object, a DOM API or a BOM API cannot be used.

3. Because a communication process between the logical layer and the render layer (view layer) of the WeChat mini program is asynchronous, a bullet comment element is obtained and operated asynchronously in the WeChat mini program, but synchronously in a browser.

Although the WeChat mini program provides an API for obtaining a bullet comment element, due to asynchronous communication between the render layer and the logical layer of the WeChat mini program, an operation for obtaining a bullet comment element becomes asynchronous in the WeChat mini program. This directly causes the complexity of obtaining data such as a width or a position of the bullet comment element. When a series of complex calculations on a bullet comment begin in a next frame, but calculations of the last frame remain in the step of obtaining bullet comment element information, a large number of unpredictable bugs occur. To solve the above problem, the embodiments provide some exemplary solutions which are specifically as follows.

Figure 1:
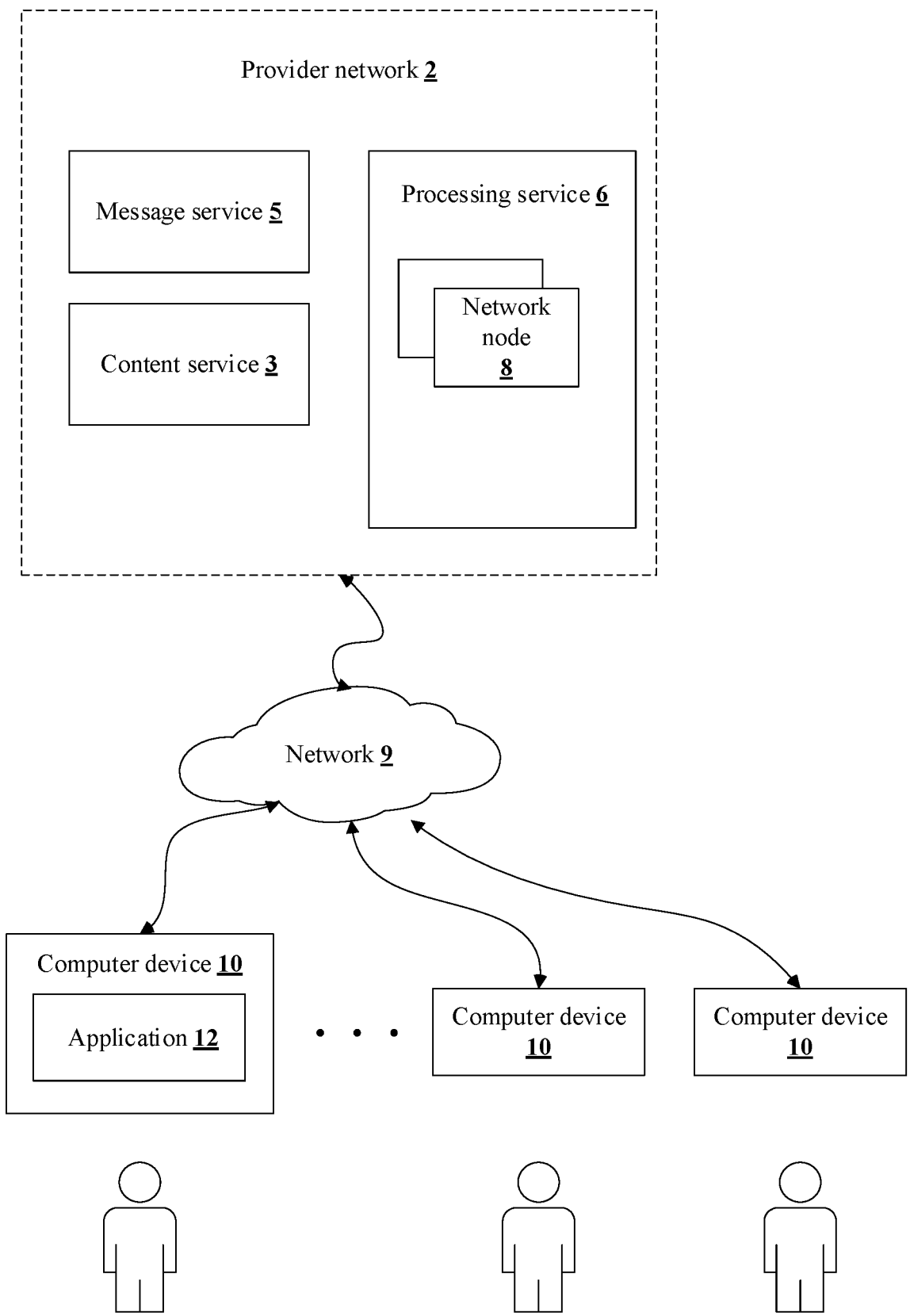
FIG. 1 schematically shows an application environment diagram of WeChat mini program based bullet comment processing method according to an embodiment of the present application.

FIG. 1 schematically shows an environment application diagram of a WeChat mini program based bullet comment processing method according to an embodiment of the present application.

A provider network 2 may be connected to a plurality of computer devices 10 through a network 9. In some embodiments, a content service 3 is provided by the provider network 2. In other embodiments, the content service 3 may be provided by an independent content provider connected to the provider network 2.

The content service 3 may include a content streaming service such as an Internet protocol video streaming service. The content streaming service may be configured to distribute content via various transmission technologies. The content service 3 may be configured to provide content such as videos, audio, text data, and a combination thereof. The content may include content streams (for example, video streams, audio streams, and information streams), content files (for example, video files, audio files, and text files), and/or other data.

The provider network 2 may implement a bullet comment service, which is configured to allow a user to make comments and/or share comments associated with content. Bullet comment content may be presented on the same screen together with the content. For example, the bullet comment content may be displayed in an overlay image above the content. The bullet comment content may be displayed with an animation effect. For example, the bullet comment content may be displayed as scrolling above the content (for example, from right to left, from left to right, from top to bottom, and from bottom to top), and the animation effect may be implemented based on transition attributes of CSS3 (cascading style sheets).

The provider network 2 may be located in a data center, for example, on a single site, or distributed at different geographical positions (for example, on a plurality of sites). The provider network 2 may provide services via one or more networks 9. The network 9 includes various network devices, for example, routers, switches, multiplexers, hubs, modems, network bridges, repeaters, firewalls, proxy devices, and/or the like. The network 9 may include physical links, for example, coaxial cable links, twisted pair cable links, optical fiber links, and a combination thereof. The network 9 may include wireless links, for example, cellular links, satellite links, and Wi-Fi links.

The provider network 2 may include a message service 5. The message service 5 may be configured to receive a plurality of messages. The plurality of messages may include a plurality of bullet comment content associated with the content and information related to the plurality of bullet comment content.

The message service 5 may be configured to manage messages used for various content items. The user may browse the content and access different content items to view comments on specific content, for example, comments posted by other users on the specific content. A comment, associated with a specific content item, from a user, may be output to other users viewing the specific content item. For example, all users accessing a content item (for example, video editing) may view comments associated with the content item. The input bullet comment content may be output in real time or almost in real time.

The message service 5 may be configured to process the plurality of messages. The message service 5 may queue the plurality of messages or prioritize them in other manners on the basis of information (for example, timestamps and incremental identifiers) associated with the corresponding bullet comment content. The message service 5 may be configured to process the plurality of messages through load balancing. For example, the message service 5 may be configured to use one or more of a plurality of processing nodes to process the plurality of messages, prioritize the messages, and perform load balancing for the messages. The message service 5 may at least temporarily store the plurality of messages. The message service 5 may store the plurality of messages in a data storage such as a database.

The message service 5 may be configured to process the messages by performing a grouping process. The grouping process may include grouping of the plurality of messages based on features. If two messages have the same features or fall within a threshold range of features, the two messages may be grouped together. Messages associated with the specific content item (for example, a stream, a file, a program, a movie, a song, and a game session) may be associated with a same group. For example, a message may include a content identifier or be associated with a content identifier. The content identifier may uniquely identify a content item. If the content identifier is found in a message or is associated with a message (for example, is sent separately), the message service 5 may associate the message with a group associated with the content item.

The message service 5 may perform natural language processing, topic identification, mode identification, artificial intelligence, etc. to automatically determine a feature of a message and/or group the message. As an example, a phrase or a mode which frequently appears may be identified as a topic. As another example, a database of a topic associated with content may be maintained. The topic may include genres (for example, an action, a drama, and a comedy), personalities (for example, an actor, an actress, and a director), languages, etc. Messages may be grouped based on a feature of a client device and/or a user sending the messages. Demography, interest, history, and/or the like may be stored for a plurality of users to determine potential groups of messages.

The message service 5 may be further configured to process the messages by generating output data. The output data may include an instruction for outputting a comment based on corresponding context. The output data may include application data for applying an overlay comment based on an indication of the context. The output data may include an instruction for generating (for example, encoding) content corresponding to a comment.

The output data may be used to generate (for example, encode) output bullet comment content, for example, output content streams. The output comment content may be combined (for example, multiplexing) with an original content item, for example, content provided by the content service 3. An obtained combination may include content in a single package (for example, a container, a transport container, and a transport stream). A package may include the original content item and the output bullet comment content (which is, for example, displayed on the top of the original content item).

The message service 5 may be further configured to process the messages by performing a filtering process. The filtering process may include rejecting or marking messages matching a filtering criterion. The filtering criterion may specify a term and/or a phrase, for example, profanity, a hate comment, and an indecent comment. The filtering criterion may specify a character, for example, a symbol or a font. The filtering criterion may specify a language, and a computer-readable code mode, etc.

The provider network 2 may further include a processing service 6. The processing service 6 may be configured to provide processing for various services, for example, a service of the provider network 2. The processing service 6 may include a plurality of network nodes 8. The plurality of network nodes 8 may process tasks associated with the message service 5. The plurality of network nodes 8 may be implemented as one or more computing devices, one or more processors, one or more virtual computing instances, a combination thereof, and/or the like.

The plurality of network nodes 8 may be implemented by one or more computing devices. The one or more computing devices may include a virtualized computing instance. The virtualized computing instance may include a virtual machine, for example, a simulation of a computer system, an operating system, and a server, etc. The computing device may load the virtual machine based on a virtual image and/or other data defined for specific software for simulation (for example, an operating system, a specific application, and a server). As the requirements on different types of processing services change, different virtual machines may be loaded and/or terminated on the one or more computing devices. A hypervisor may be implemented to manage the use of different virtual machines on the same computing device.

In some embodiments, the plurality of network nodes 8 may process events submitted by a plurality of computer devices. These events may be associated with discussions on real-time news, videos, social hotspots, reports on some user accounts, etc. In other embodiments, the plurality of network nodes 8 may process performance evaluation of a plurality of user accounts for reviewing events in a network community. In some implementations, these services may be implemented as dedicated computing devices, dedicated processors, dedicated virtual machine instances, and/or the like. In other implementations, various nodes may implement any function associated with these services.

The plurality of computer devices 10 may be configured to access content and a service of the provider network 2. The plurality of computer devices 10 may include any type of electronic devices, for example, mobile devices, tablet devices, laptop computers, workstations, virtual reality devices, game devices, set-top boxes, digital streaming media devices, vehicle terminals, smart televisions, the set-top boxes, and e-book readers, etc.

The plurality of computer devices 10 may be associated with one or more users. A single user may access the provider network 2 using one or more of the plurality of computer devices 10. The plurality of computer devices 10 may travel to various positions and use different networks to access the provider network 2.

The computer device 10 may include an application 12. The application 12 outputs (for example, shows, renders, or displays) content to a user. The application 12 may be a video client (for example, a Bilibili client), a browser client, or a WeChat based WeChat mini program, etc. The content may include a video, audio, a bullet comment content, and/or the like. The bullet comment content may be words, expressions, patterns, etc., and may have different colors, sizes, animations, scrolling directions, etc.

As an example, the application program 12 may send reports for some users to the processing service, and the application program 12 may also send comments regarding the reports to the processing service 6. Events or comments sent from the plurality of computer devices 10 include the reasons for submitting the events, the content attributes associated with the events, and the user account information, etc.

Embodiment 1

Figure 2:
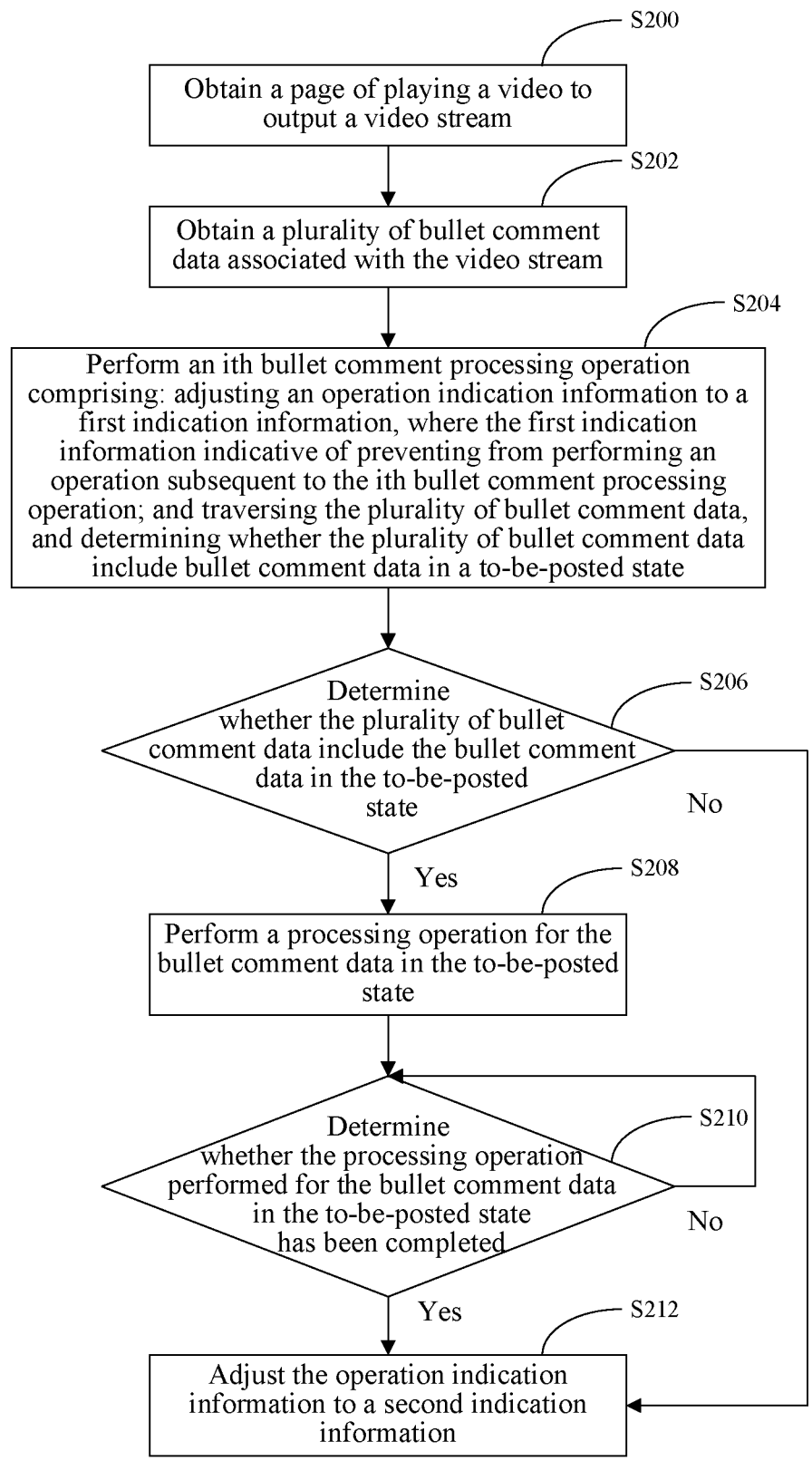
FIG. 2 schematically shows a flowchart of a WeChat mini program based bullet comment processing method according to Embodiment 1 of the present application.

FIG. 2 schematically shows a flowchart of a WeChat mini program based bullet comment processing method according to Embodiment 1 of the present application. It can be understood that this method embodiment may be executed in a computer device 10, and the flowchart of such operation embodiment is not used to limit an order of executing steps.

As shown in FIG. 2, the WeChat mini program based bullet comment processing method may include steps S200 to S212:

In step S200, a page of playing a video to output a video stream is obtained.

The video playback page is a page on a WeChat mini program based framework.

The video playback page includes a logical layer and a view layer, where the logical layer includes a bullet comment loader, a bullet comment calculator, and a bullet comment timeline. The bullet comment loader is responsible for operations such as requesting, and compiling parsing of bullet comment data, the bullet comment calculator is responsible for operations such as traversal search of bullet comment data, and the bullet comment timeline is responsible for updating a timeline.

In step S202, a plurality of bullet comment data associated with the video stream are obtained.

In an exemplary embodiment, the plurality of bullet comment data may be original bullet comment data.

In some other embodiments, the plurality of bullet comment data may alternatively be bullet comment data obtained by cloning a plurality of original bullet comment data. Specifically, the computer device 10 initiates a bullet comment obtaining request to the provider network 2 by the bullet comment loader, and receives a plurality of original bullet comment data returned by the provider network 2. Then, the plurality of original bullet comment data are cloned. The plurality of original bullet comment data are not used for bullet comment displaying, and the plurality of bullet comment data are used for bullet comment displaying.

The plurality of original bullet comment data and the plurality of bullet comment data are information consistent, and are stored in an array format.

For example, each bullet comment data may include the following information:

```
{
    stime, // Time of posting in a video in units of second
    mode, // Mode of a bullet comment
    size, // Size of bullet comment text
    color, //Color of bullet comment text
    date, // Creation date of a bullet comment
    class, // Class name of a bullet comment
    uid, // id of a user that creates a bullet comment
    dmid, // Bullet comment id
    text, // Text content of a bullet comment
    duration, // Duration of a bullet comment
    border, // Whether a bullet comment has a border
    borderColor, // Color of a bullet comment border
    style, // Interline style of bullet comments
}
```

Because the video playback page is a page in a WeChat mini program based framework, the video playing page includes a logical layer and a view layer, and communication between the logical layer and the view layer is asynchronous. The asynchronous communication is prone to cause bugs when possessing the plurality of bullet comments. To solve the problem, a single-thread block mechanism is simulated in this embodiment. Specific steps for implementation are as follows:

In step S204, an $i^{th}$ bullet comment processing operation is performed: adjusting an operation indication information to a first indication information, where the first indication information is used to indicate that an operation subsequent to the $i^{th}$ bullet comment processing operation is prevented from performing; and traversing the plurality of bullet comment data, to query whether the plurality of bullet comment data include bullet comment data in a to-be-posted state.

Herein, i is a positive integer starting from 1.

The operation of traversing the plurality of bullet comment data may further include: finding out whether the plurality of bullet comment data include bullet comment data in an expired state, to trigger a bullet comment recovery mechanism. Exemplarily, posting time of each bullet comment data in a to-be-posted state is smaller than or equal to current playing time of the video stream. A sum of posting time and moving time of each bullet comment data in an expired state is smaller than the current playing time. To adapt to the WeChat mini program framework, the operation further includes: obtaining the current playing time of the video stream: updating the timeline in a mode of simulating requestAnimationFrame by the bullet comment timeline, to determine an updated timeline as the current playing time of the video stream.

Performing the $i^{th}$ bullet comment processing operation specifically includes: (1) adjusting the operation indication information to the first indication information, where the first indication information indicates that the $i^{th}$ bullet comment processing operation is being performed, to notify the computer device 10 not to perform a subsequent operation other than the $i^{th}$ bullet comment processing operation; and (2) enabling the bullet comment calculator and the bullet comment timeline, where after a bullet comment begins displaying, the bullet comment timeline simulates video time every 16.7 milliseconds in the mode of simulating requestAnimationFrame to update the timeline, to determine that the bullet comment timeline and the current playing time is synchronous. The current playing time and stime (posting time) in each bullet comment data are compared. If the posting time of bullet comment data is smaller than or equal to current playing time, it is considered that the bullet comment data reaches the posting time, so that the bullet comment data is added backwards to a queue of to-be-posted bullet comments. If a sum of stime (posting time) and duration (moving time) of bullet comment data is smaller than current playing time, it indicates that the bullet comment data has "expired". In other embodiments, an time interval of one second may be added, i.e., if "stime (posting time)+duration (moving time)+one second" in bullet comment data is smaller than current playing time, it indicates that one second has elapsed since the moving time of the bullet comment data ends, so that it is considered that the bullet comment data has "expired".

In step S206, whether the plurality of bullet comment data include the bullet comment data in the to-be-posted state is determined. If the plurality of bullet comment data include the bullet comment data in the to-be-posted state, the process proceeds to step S208, otherwise, the process proceeds to step S212.

In step S208, a processing operation is performed for the bullet comment data in the to-be-posted state.

Figure 3:
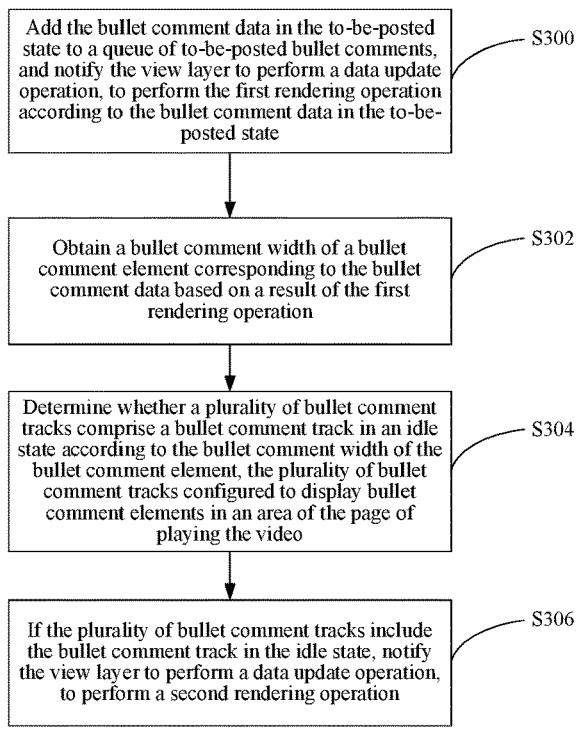
FIG. 3 schematically shows a substep of step S208 in FIG. 2.

As shown in FIG. 3, the processing operation performed for the bullet comment data in the to-be-posted state may include steps as follows: In step S300, the bullet comment data in the to-be-posted state is added to a queue of to-be-posted bullet comments, and the view layer is notified to perform a data update operation, to perform the first rendering operation according to the bullet comment data in the to-be-posted state. The first rendering operation is as follows: Real bullet comment elements are inserted outside a view area, which are invisible to a user, and no motion effects are added. Such an operation aims at facilitating subsequent obtaining of a real bullet comment width of the bullet comment element so as to calculate a start motion position and an end motion position of a bullet comment, and to be used as one of bases for determining whether there is a bullet comment track in an idle state in a plurality of bullet comment tracks. In step S302, a bullet comment width of a bullet comment element resulting from the first rendering operation is obtained. In step S304, whether a plurality of bullet comment tracks comprise a bullet comment track in an idle state is determined according to the bullet comment width of the bullet comment element, the plurality of bullet comment tracks configured to display bullet comment elements in an area of the page of playing the video. In step S306, if the plurality of bullet comment tracks include the bullet comment track in the idle state, the view layer is notified to perform a data update operation, to perform a second rendering operation. A bullet comment element resulting from the second rendering operation is configured to be displayed on the page of playing the video. The second rendering operation: data binding is performed on a bullet comment speed, a bullet comment width, bullet comment content, a motion effect, and the like of the bullet comment element, and the view layer is notified to further render a corresponding bullet comment element according to bound data. If the plurality of bullet comment tracks do not comprise the bullet comment track in the idle state, which means that there are currently too many bullet comment comments, the bullet comment data in the to-be-posted state is discarded from the queue of to-be-posted bullet comments.

Because of the asynchronous communication between a logical layer and a view layer (used to perform a rendering operation), steps such as the first rendering operation, obtaining bullet comment element information, and the second rendering operation are all asynchronous operations. In a process of performing these asynchronous operations, unpredictable bugs are prone to be caused if another operation is added. That is, in the process of performing these asynchronous operations, the operation indication information is maintained to be the first indication information to block other unrelated operations, thereby coping with bugs caused by other unrelated operations in the process of performing these asynchronous operations.

Figure 4:
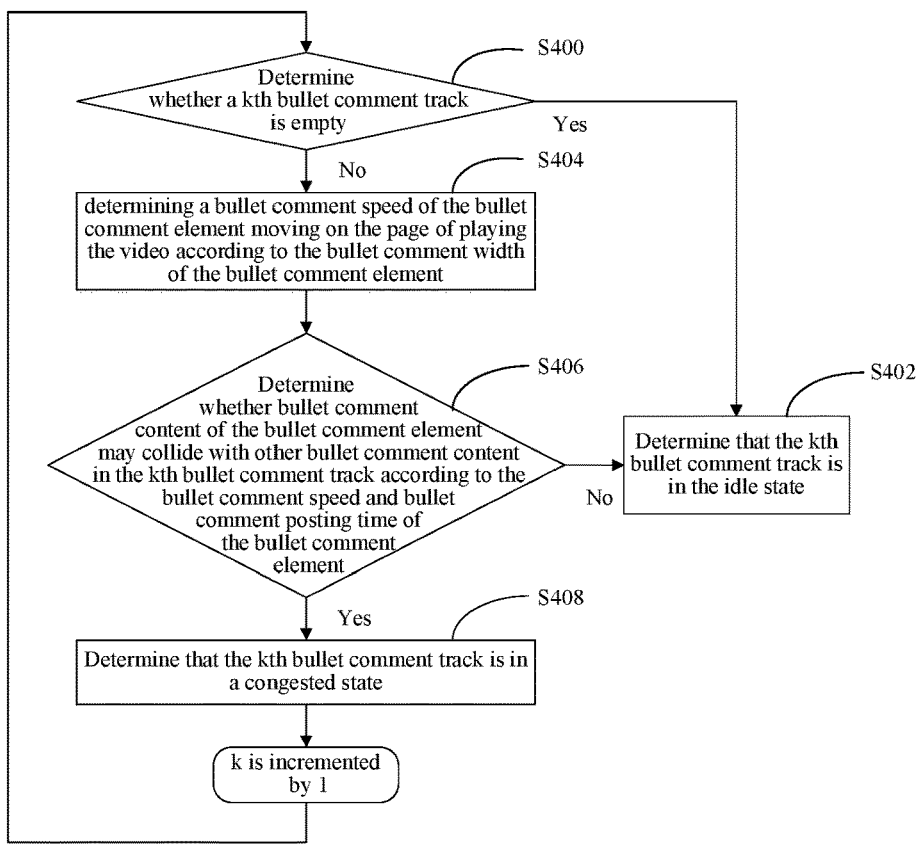
FIG. 4 schematically shows an additional step of step S304 in FIG. 3.

It can be understood that there may be a plurality of manners of determining whether the plurality of bullet comment tracks include the bullet comment track in the idle state. For example, as shown in FIG. 4, whether each bullet comment track is in the idle state may be determined through steps as follows: In step S400, whether a $k^{th}$ bullet comment track is empty is determined. If the $k^{th}$ bullet comment track is empty, the process proceeds to step S402, otherwise, the process proceeds to step S404. In step S402, it is determined that the $k^{th}$ bullet comment track is in the idle state. In step S404, a bullet comment speed of the bullet comment element moving on the page of playing the video is calculated according to the bullet comment width of the bullet comment element. In step S406, whether bullet comment content of the bullet comment element may collide with other bullet comment content displayed in the $k^{th}$ bullet comment track is determined according to the bullet comment speed and bullet comment posting time of the bullet comment element. If the bullet comment content of the bullet comment elements may collide with other bullet comment content in the $k^{th}$ bullet comment track, the process proceeds to step S402, otherwise, the process proceeds to step S408. In step S408, it is determined that the $k^{th}$ bullet comment track is in a congested state.

In step S210, whether the processing operation performed for the bullet comment data in the to-be-posted state has been completed is determined. If the processing operation performed for the bullet comment data in the to-be-posted state has been completed, the process proceeds to step S212, otherwise, a loop determination operation is performed.

In step S212, the operation indication information is adjusted to a second indication information.

The second indication information is used to indicate that the operation subsequent to the $i^{th}$ bullet comment processing operation is allowed to be performed.

(1) If the plurality of bullet comment data do not include the bullet comment data in the to-be-posted state, it indicates that no new requirement for creating a bullet comment element is found, and there is no subsequent step to be performed (for example, a step of the first rendering operation, a step of obtaining bullet comment element information, or a step of the second rendering operation) in the $i^{th}$ bullet comment processing operation, which means that the $i^{th}$ bullet comment processing operation has been completed at this time. Therefore, the operation indication information is adjusted to the second indication information, to notify the computer device 10 that the operation subsequent to the $i^{th}$ bullet comment processing operation can be performed. Then, an $(i+1)^{th}$ bullet comment processing operation starts to be performed based on an updated timeline (for example, after 16.7 milliseconds in simulating a mechanism of requestAnimationFrame). This aims at reducing a time for calculation and reducing an unnecessary waste of performance.

(2) If the data update operation at the view layer has been completed, the bullet comment data in the to-be-posted state has been processed, i.e., the $i^{th}$ bullet comment processing operation has been completed. Therefore, the operation indication information is adjusted to the second indication information, to notify the computer device 10 that the operation subsequent to the $i^{th}$ bullet comment processing operation can be performed.

It can be understood that:

due to asynchronous communication between a render layer and a logical layer of a WeChat mini program, an operation for processing the bullet comment data in the to-be-posted state includes a plurality of asynchronous steps, for example, an operation for obtaining element information. This directly causes that obtaining data such as a width or a position of the element information becomes complex. It is possible that while bullet comment data in a current bullet comment processing operation is still in a processing step (a step for obtaining element information), a traversing operation in a next bullet comment processing operation already begins. This is prone to cause unpredictable bugs. In this embodiment, simulation of a single-thread block mechanism is performed. Operation indication information is used for performing or blocking an operation subsequent to a bullet comment operation, to ensure that each bullet comment processing operation is performed after the previous bullet comment processing operation has been completed, and the former bullet comment processing operation is not affected by the latter bullet comment processing operation, thereby avoiding unpredictable bugs.

In an exemplary embodiment, the operation subsequent to the $i^{th}$ bullet comment processing operation includes: an $(i+1)^{th}$ bullet comment processing operation, or an event processing operation based on a user event. The user event may be an event such as pause, stop, or reset.

Figure 5:
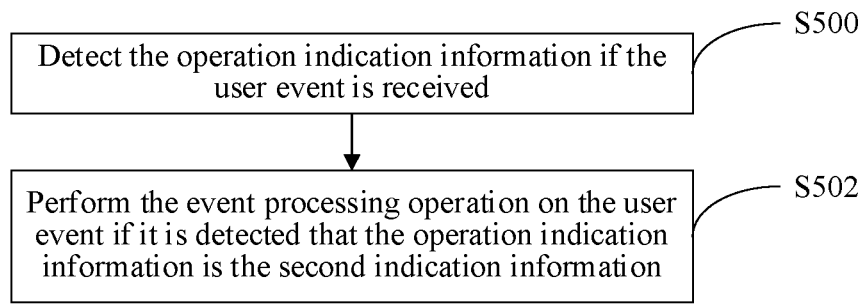
FIG. 5 schematically shows an additional step in FIG. 2.

In an exemplary embodiment, as shown in FIG. 5, the WeChat mini program based bullet comment processing method may further include steps S500 to S502: In step S500, the operation indication information is detected if the user event is received. In step S502, the event processing operation is performed on the user event if it is detected that the operation indication information is the second indication information.

Figure 6:
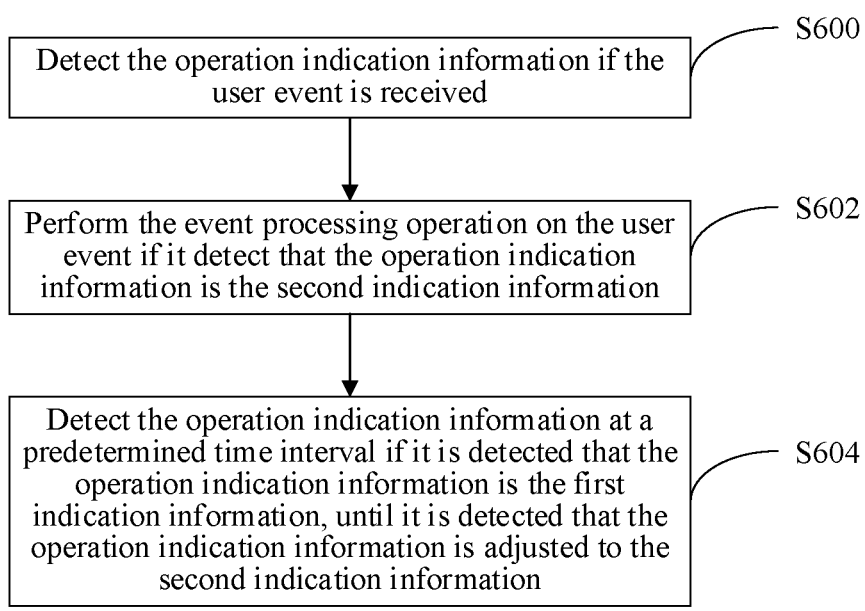
FIG. 6 schematically shows another additional step in FIG. 2.

In an exemplary embodiment, as shown in FIG. 6, the WeChat mini program based bullet comment processing method may further include steps S600 to S604: In step S600, the operation indication information is detected if the user event is received. In step S602, the event processing operation is performed on the user event if it is detected that the operation indication information is the second indication information. In step S604, the operation indication information is detected at a predetermined time interval if it is detected that the operation indication information is the first indication information, until it is detected that the operation indication information is adjusted to the second indication information.

Based on testing, around 50 milliseconds are required for fully completing one bullet comment processing operation. That is, within around 50 milliseconds, another task (for example, the next bullet comment processing operation or the event processing operation described above) is not allowed to be processed, otherwise uncontrollable bugs are caused by out of sync data. Therefore, when a user clicks to pause, working of the bullet comment calculator and the bullet comment timeline needs to pause. If the pause is performed exactly within the 50 milliseconds, bugs will occur, so that a series of instructions such as pause, stop, and reset commands are not executed until a current bullet comment processing operation ends.

As an example: if a user clicks a command such as pause, stop, reset, or any command that can only be executed in an idle state of calculation, and a corresponding user event is generated, whether the operation indication information is the second indication information is detected every 16 milliseconds. If the operation indication information is the second indication information, an event processing operation is performed, for example, invoking an event processing function corresponding to the user event. This can not only avoid unpredictable bugs caused by asynchronous communication issues between a logical layer and a render layer, but can also reduce a plurality of repeated calculations, thereby enhancing overall rendering performance.

Figure 7:
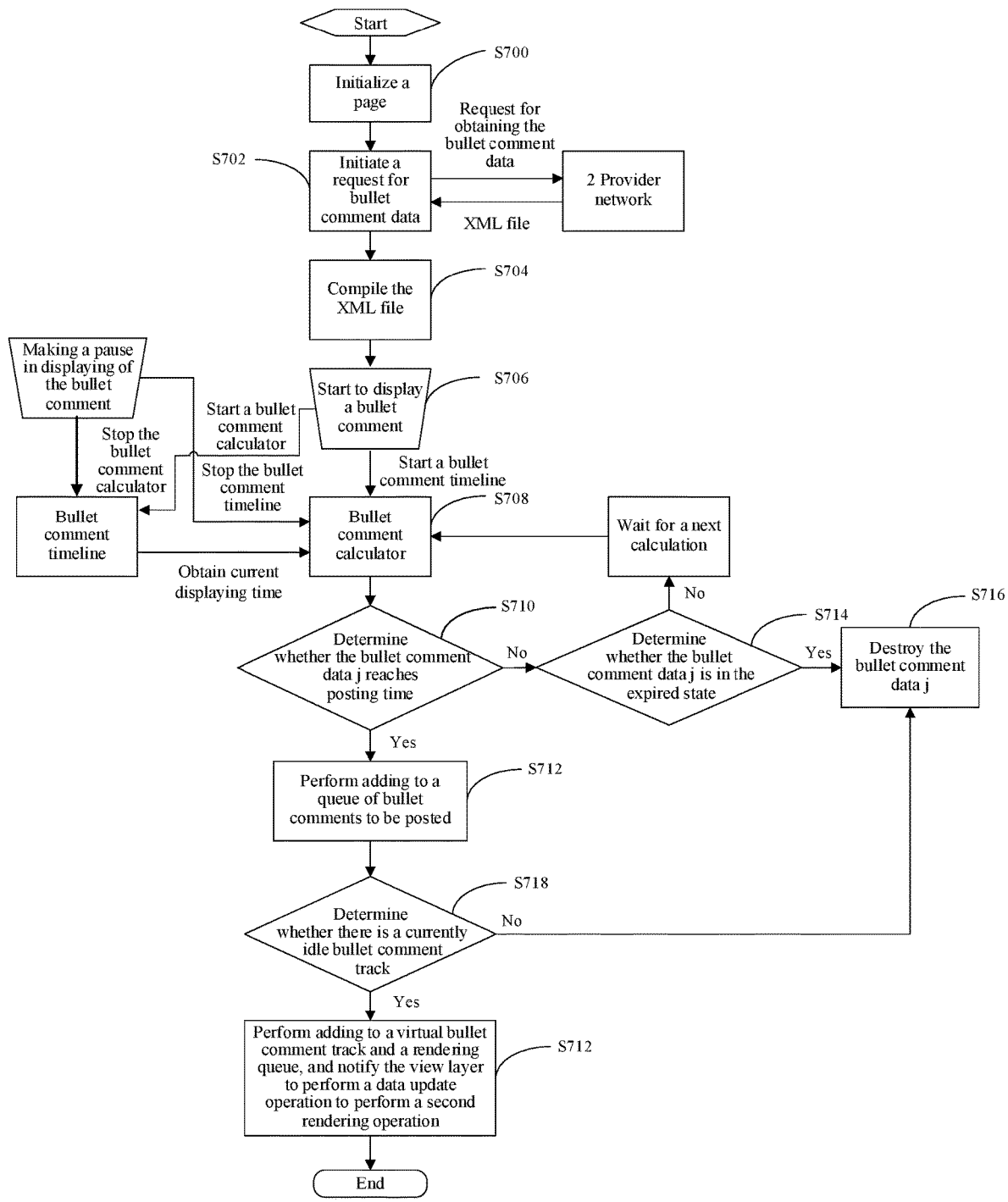
FIG. 7 schematically shows another flowchart of a WeChat mini program based bullet comment processing method according to Embodiment 1 of the present application.

As shown in FIG. 7, the following provides a specific example for better understanding. It should be noted that this example is not used to limit the protection scope of the patent.

In step S700, an initialization operation is performed on a WeChat mini program page.

In step S702, a request for bullet comment data is initiated.

After the WeChat mini program page is initialized, a bullet comment loader initiates the request for the bullet comment data to a provider network 2, and receives an XML (extensible markup language) file returned by the provider network 2.

The bullet comment loader is located at a logical layer of the WeChat mini program page. The logical layer also includes a bullet comment calculator and a bullet comment timeline.

In step S704, the XML file is compiled to obtain a plurality of bullet comment data.

Specifically, the XML file is compiled into an Element object, a plurality of bullet comment data, for example, attributes (bullet comment data) such as bullet comment content, posting time, a bullet comment color, and moving time are obtained from the Element object, and these attributes are converted into a json data format and stored in a local array, to obtain a plurality of bullet comment data stored in the local array.

The plurality of bullet comment data may be used for bullet comment displaying; or may be used as original data, and not used for bullet comment displaying, where for example, the plurality of bullet comment data may be cloned, and a plurality of bullet comment data resulting from cloning are used for bullet comment displaying.

In this example, the plurality of bullet comment data are used for bullet comment displaying.

In step S706, a bullet comment starts to be displayed:

performing an $i^{th}$ bullet comment processing operation, and adjusting an operation indication information to a first indication information, where i is a positive integer starting from 1 1.

The first indication information is used to indicate that an operation subsequent to the $i^{th}$ bullet comment processing operation is prevented from performing.

The bullet comment calculator is used for bullet comment filtering and calculation. The bullet comment timeline is used to manage the bullet comment timeline, that is, synchronizing current playing time of video streams.

The bullet comment calculator and a bullet comment timeline are located at a logical layer of the application 12 (such as a browser and a WeChat mini program), and the bullet comment timeline and the bullet comment calculator may work parallelly in a recursively called frame rendering mode through the logical layer.

When the bullet comment calculator detects that posting of the plurality of bullet comment data is completed, the bullet comment calculator and the bullet comment timeline stop running and a bullet comment system is reset. In addition, if that a user clicks an event such as pause or stop is detected at a view layer of a computer device 10, the view layer notifies the user event to a logical layer. Because the $i^{th}$ bullet comment processing operation is still performed at the logical layer currently, steps as follows need to be performed: each time a timeline of the bullet comment timeline is updated, the operation indication information is detected, until it is detected that the operation indication information is adjusted to the second indication information, in which case processing of the user event begins. An advantage of such operation is avoiding unpredictable bugs occurring because a user event operation is added when the computer device 10 performs the $i^{th}$ bullet comment processing operation.

In step S708, each bullet comment data is traversed by the bullet comment calculator to perform calculation and screening, to determine whether each bullet comment data is in a to-be-posted state or in an expired state.

The following takes one bullet comment data j therein as an example:

In step S710, whether the bullet comment data j reaches posting time is determined. If the bullet comment data j reaches the posting time, the process proceeds to step S712, otherwise, the process proceeds to step S714.

It is determined, according to current playing time of a video stream and the posting time in the bullet comment data j, whether bullet comment content in the bullet comment data j reaches the posting time, that is, whether the bullet comment data j is in the to-be-posted state at present.

In step S712, the bullet comment data j is sent to the queue of to-be-posted bullet comments, and the view layer is notified to perform a data update operation to perform the first rendering operation. The process proceeds to step S718:

The view layer is notified to perform the data update operation, and perform the first rendering operation according to the bullet comment data in the to-be-posted state.

For example, real bullet comment elements are inserted outside a view area, which are invisible to a user without added motion effects. Such an operation is to obtain a real bullet comment width of the bullet comment element for calculating an initial position of the movement and an end position of the movement of the bullet comment, and to be used as one of bases for determining whether there is a bullet comment track in an idle state in a plurality of bullet comment tracks.

The bullet comment data j added to the queue of to-be-posted bullet comments may be deleted from the plurality of bullet comment data to reduce the number of subsequent traversals.

In step S714, whether the bullet comment data j is in the expired state is determined. If the bullet comment data j is in the expired state, the process proceeds to step S716, otherwise, the bullet comment data j waits for the next traversal operation.

In step S716, the bullet comment data j is destroyed. For example, the bullet comment data j is deleted from the plurality of bullet comment data to reduce the number of subsequent traversals.

In step S718, whether there is a currently idle bullet comment track is determined. If there is an idle bullet comment track, the process proceeds to step S720, otherwise, the process proceeds to step S716.

Exemplarily, a bullet comment width of a bullet comment element resulting from the first rendering operation is obtained. Whether the plurality of bullet comment tracks include a bullet comment track in the idle state is determined according to the bullet comment width of the bullet comment element.

Assuming that posting time and moving time of the last bullet comment content in the $k^{th}$ bullet comment track are $t_1$ and $t_2$ respectively, then the time for the last bullet comment content completely disappearing from the bullet comment displaying area (the view area) is $t_1+t_2$, and that the posting time, the moving time, and the bullet comment width of the bullet comment data j and the displaying width of the bullet comment displaying area are $t_3$, $t_4$, $w_2$, and $w_1$ respectively, a moving speed of the bullet comment data j is $s_1=(w_1+w_2)/t_4$. Therefore, it may be concluded that time when the bullet comment content in the bullet comment data j reaches the left boundary of the bullet comment displaying area for the first time is $t_3+(w_1/s_1)$. When $t_1+t_2<t_3+(w_1/s_1)$, it is indicated that when the last bullet comment content completely disappears from the bullet comment displaying area, the bullet comment content in the bullet comment data j still has not caught up with the last bullet comment content. This means that the last bullet comment content will not collide with the bullet comment content in the bullet comment data j, and therefore, it may be determined that the current state of the $k^{th}$ bullet comment track is the idle state.

In step S720, adding is performed to a virtual bullet comment track and a rendering list, and the view layer is notified to perform a data update operation to perform a second rendering operation.

(1) The bullet comment data j in the queue of to-be-posted bullet comments is added to the virtual bullet comment track. The virtual bullet comment track is used for determining whether each bullet comment track is in the idle state.

(2) The bullet comment data j in the queue of to-be-posted bullet comments is added to the rendering list to create a corresponding bullet comment element.

After all bullet comment data to be posted obtained through filtering in the $i^{th}$ bullet comment processing operation is processed (for example, on which the second bullet comment rendering operation or destroying is performed), the operation indication information is adjusted to the second indication information. i is incremented by 1 to perform a next bullet comment processing operation or another subsequent operation such as pause, stop, or reset.

Embodiment 2

Figure 8:
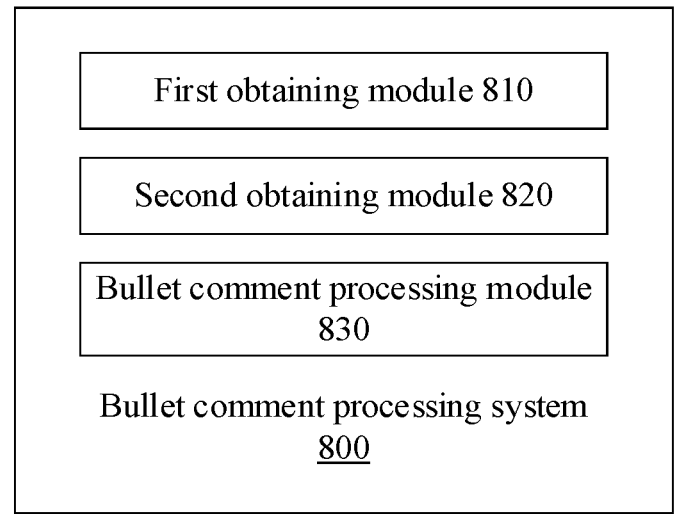
FIG. 8 schematically shows a block diagram of a communication system according to Embodiment 2 of the present application.

FIG. 8 schematically shows a block diagram of a WeChat mini program based bullet comment processing system according to Embodiment 2 of the present application. The WeChat mini program based bullet comment processing system may be divided into one or more program modules, and the one or more program modules are stored in a storage medium and executed by one or more processors to implement the embodiments of the present application. The program modules referred to in the embodiments of the present application refer to a series of computer-readable instruction segments that can complete a specific function. The functions of various program modules in the embodiments will be specifically described in the following descriptions.

As shown in FIG. 8, the WeChat mini program based bullet comment processing system 800 may include a first obtaining module 810, a second obtaining module 820, and a bullet comment processing module 830.

The first obtaining module 810 is to obtain a video playback page for outputting a video stream.

The second obtaining module 820 is to obtain a plurality of bullet comment data associated with the video stream.

The bullet comment processing module 830 is to perform an $i^{th}$ bullet comment processing operation, including: adjusting an operation indication information to a first indication information, the first indication information is used to indicate that an operation subsequent to the $i^{th}$ bullet comment processing operation is prevented from performing; traversing the plurality of bullet comment data, to query whether the plurality of bullet comment data comprise bullet comment data in a to-be-posted state; and if the plurality of bullet comment data include the bullet comment data in the to-be-posted state, performing a processing operation for the bullet comment data in the to-be-posted state; determining whether the processing operation performed for the bullet comment data in the to-be-posted state has been completed; and if the processing operation performed for the bullet comment data in the to-be-posted state has been completed, adjusting the operation indication information to a second indication information, where the second indication information is used to indicate that the operation subsequent to the $i^{th}$ bullet comment processing operation is allowed to be performed.

In an exemplary embodiment, the performing a processing operation for the bullet comment data in the to-be-posted state includes: adding the bullet comment data in the to-be-posted state to a queue of to-be-posted bullet comments, and notifying the view layer to perform a data update operation to perform a first rendering operation according to the bullet comment data in the to-be-posted state; obtaining a bullet comment width of a bullet comment element resulting from the first rendering operation; determining, according to the bullet comment width of the bullet comment element, whether a plurality of bullet comment tracks include a bullet comment track in an idle state; and if the plurality of bullet comment tracks include the bullet comment track in the idle state, notifying the view layer to perform a data update operation to perform a second rendering operation, where a bullet comment element resulting from the second rendering operation is used for bullet comment displaying.

In an exemplary embodiment, the determining, according to the bullet comment width of the bullet comment element, whether a plurality of bullet comment tracks include a bullet comment track in an idle state includes: determining whether a $k^{th}$ bullet comment track is empty; if the $k^{th}$ bullet comment track is empty, determining that the $k^{th}$ bullet comment track is in the idle state; if the $k^{th}$ bullet comment track is not empty, calculating a bullet comment speed of the bullet comment element according to the bullet comment width of the bullet comment element; determining, according to the bullet comment speed and bullet comment posting time of the bullet comment element, whether bullet comment content of the bullet comment element may collide with other bullet comment content in the $k^{th}$ bullet comment track; and if the bullet comment content of the bullet comment element may not collide with other bullet comment content in the $k^{th}$ bullet comment track, determining that the $k^{th}$ bullet comment track is in the idle state; and if the bullet comment content of the bullet comment element may collide with other bullet comment content in the $k^{th}$ bullet comment track, determining that the $k^{th}$ bullet comment track is in a congested state.

In an exemplary embodiment, the operation subsequent to the $i^{th}$ bullet comment processing operation includes: an $(i+1)^{th}$ bullet comment processing operation, or an event processing operation based on a user event.

In an exemplary embodiment, the bullet comment processing module 830 is further to: detect the operation indication information if the user event is received; and perform the event processing operation for the user event if it is detected that the operation indication information is the second indication information.

In an exemplary embodiment, the bullet comment processing module 830 is further to: detect the operation indication information at a predetermined time interval if it is detected that the operation indication information is the first indication information, until it is detected that the operation indication information is adjusted to the second indication information.

In an exemplary embodiment, the bullet comment processing module 830 is further to: if the plurality of bullet comment data do not include the bullet comment data in the to-be-posted state, adjust the operation indication information to the second indication information.

Embodiment 3

Figure 9:
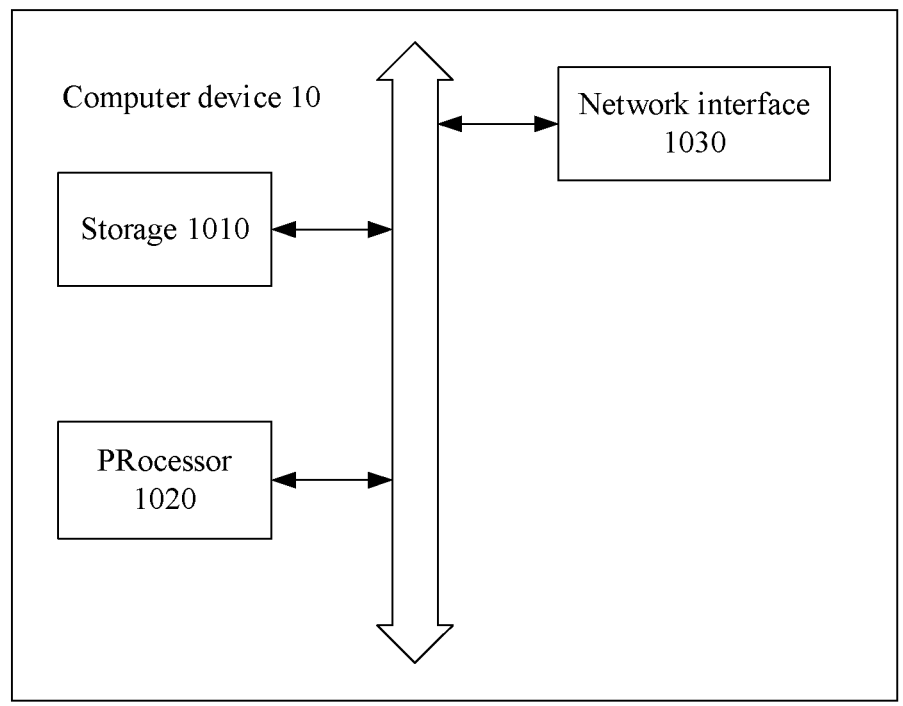
FIG. 9 schematically shows a diagram of a hardware architecture of a computer device suitable for implementing a WeChat mini program based bullet comment processing method according to Embodiment 3 of the present application.

FIG. 9 schematically shows a hardware architecture schematic diagram of a computer device suitable for implementing a WeChat mini program based bullet comment processing method according to Embodiment 3 of the present application. In this embodiment, a computer device 10 is a device that may automatically perform numerical calculation and/or information processing according to preset or pre-stored instructions. The computer device 10 may be, for example, a smartphone, a computer, a projector, a set-top box, etc., or may be a virtual machine host process and one or more virtual machine instances, or a rack server, a blade server, a tower server, or a cabinet server (including an independent server or a server cluster composed of a plurality of servers), etc. As shown in FIG. 9, the computer device 10 at least includes, but is not limited to, a storage 1010, a processor 1020, and a network interface 1030, which may be communicatively connected to each other through a system bus. In the modules:

the storage 1010 includes at least one type of computer-readable storage medium, and the readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the storage 1010 may be an internal storage module of the computer device 10, for example, a hard disk or a memory of the computer device 10. In some other embodiments, the storage 1010 may alternatively be an external storage device of the computer device 10, for example, a plug-in hard disk disposed on the computer device 10, a smart media card (SMC for short), a secure digital (SD for short) card, and a flash card. Certainly, the storage 1010 may include both the internal storage module of the computer device 10 and the external storage device thereof. In this embodiment, the storage 1010 is generally used to store an operating system and various application software installed in the computer device 10, such as program codes for a WeChat mini program based bullet comment processing method. In addition, the storage 1010 may be used to temporarily store various types of data that has been output or will be output.

The processor 1020 may be, in some embodiments, a central processing unit (CPU for short), a controller, a microcontroller, a microprocessor, or other data processing chips. The processor 1020 is generally used to control overall operation of the computer device 10, for example, executing control, processing, etc. related to data exchange or communication with the computer device 10. In this embodiment, the processor 1020 is used to run program codes stored in the storage 1010 or process data.

The network interface 1030 may include a wireless network interface or a wired network interface, and the network interface 1030 is generally used to establish a communication connection between the computer device 10 and other computer devices. For example, the network interface 1030 is used to connect the computer device 10 to an external terminal through a network, and establish a data transmission channel, a communication link, etc. between the computer device 10 and the external terminal. The network may be a wireless network, such as Intranet, Internet, the Global System for Mobile Communications (GSM for short), Wideband Code Division Multiple Access (WCDMA for short), a 4G network, a 5G network, Bluetooth, Wi-Fi, or other wireless or wired networks.

It should be noted that FIG. 9 shows only a computer device with components 1010 to 1030, but it should be understood that not all of the illustrated components are required to be implemented, and more or fewer components may be alternatively implemented.

In this embodiment, the WeChat mini program based bullet comment processing method stored in the storage 1010 may also be divided into one or more program modules and executed by one or more processors (by the processor 1020 in this embodiment) to implement the present application.

Embodiment 4

This embodiment further provides a computer-readable storage medium having stored thereon computer-readable instructions, where when the computer-readable instructions are executed by a processor, the following steps are implemented: obtaining a video playback page for outputting a video stream; obtaining a plurality of bullet comment data associated with the video stream; and performing an $i^{th}$ bullet comment processing operation: adjusting an operation indication information to a first indication information, where the first indication information is used to indicate that an operation subsequent to the $i^{th}$ bullet comment processing operation is prevented from performing; traversing the plurality of bullet comment data, to query whether the plurality of bullet comment data include bullet comment data in a to-be-posted state; and if the plurality of bullet comment data include the bullet comment data in the to-be-posted state: performing a processing operation for the bullet comment data in the to-be-posted state; determining whether the processing operation performed for the bullet comment data in the to-be-posted state has been completed; and if the processing operation performed for the bullet comment data in the to-be-posted state has been completed, adjusting the operation indication information to a second indication information, where the second indication information is used to indicate that the operation subsequent to the $i^{th}$ bullet comment processing operation is allowed to be performed.

In this embodiment, the computer-readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the computer-readable storage medium may be an internal storage unit of the computer device, for example, a hard disk or a memory of the computer device. In some other embodiments, the computer-readable storage medium may alternatively be an external storage device of the computer device, for example, a plug-in hard disk disposed on the computer device, a smart media card (SMC for short), a secure digital (SD for short) card, and a flash card. Certainly, the computer-readable storage medium may alternatively include both the internal storage unit of the computer device and the external storage device thereof. In this embodiment, the computer-readable storage medium is generally to store an operating system and various application software installed in the computer device, such as program codes for a WeChat mini program based bullet comment processing method in this embodiment. In addition, the computer-readable storage medium may be to temporarily store various types of data that has been output or will be output.

It will be apparent to those skilled in the art that the various modules or steps in the embodiments of the present application can be implemented by a general-purpose computing device that can be centralized on a single computing device or distributed across a network formed by a plurality of computing devices. Optionally, they may be implemented by program codes executable by the computing device, such that they may be stored in a storage device and executed by the computing device, and in some cases, the steps shown or described may be performed in a sequence different from the sequence described herein, or they may be respectively fabricated into individual integrated circuit modules, or a plurality of modules or steps thereof may be implemented as a single integrated circuit module. In this way, the embodiments of the present application are not limited to any specific combination of hardware and software.

The foregoing descriptions are merely illustrative of preferred embodiments of the present application, and are not intended to limit the patent scope of the present application. Any equivalent structure or equivalent process transformation made using the contents of the description and accompanying drawings of the present application, or any direct or indirect application thereof in other related technical fields shall equally fall within the patent protection scope of the present application.

What is claimed is:

1. A method of processing bullet comments, comprising:
   obtaining a page of playing a video for outputting a video stream;
   obtaining a plurality of pieces of bullet comment data associated with the video stream;
   performing an $i^{th}$ bullet comment processing operation, wherein the performing an $i^{th}$ bullet comment processing operation further comprises:
      adjusting operation indication information to a first piece of indication information, the first piece of indication information indicative of preventing from performing an operation subsequent to the $i^{th}$ bullet comment processing operation, and
      traversing the plurality of pieces of bullet comment data and determining whether the plurality of bullet comment data comprise a piece of bullet comment data in a to-be-posted state;
   in response to determining that the plurality pieces of bullet comment data comprise the piece of bullet comment data in the to-be-posted state, the method further comprises:
   performing a processing operation on the piece of bullet comment data in the to-be-posted state;
   determining whether the processing operation on the piece of bullet comment data in the to-be-posted state has been completed; and
   in response to determining that the processing operation on the piece of bullet comment data in the to-be-posted state has been completed, adjusting the operation indication information to a second piece of indication information, the second indication information indicative of allowing to perform the operation subsequent to the $i^{th}$ bullet comment processing operation.

2. The method of claim 1, wherein the performing a processing operation on the piece of bullet comment data in the to-be-posted state comprises:
   adding the piece of bullet comment data to a queue of bullet comments to-be-posted, and notifying a view layer to perform a data update operation to perform a first rendering operation based on the piece of bullet comment data in the to-be-posted state;
   obtaining a width of a bullet comment element corresponding to the piece of bullet comment data based on a result of the first rendering operation;
   determining, based on the width of the bullet comment element, whether a plurality of bullet comment tracks comprise a bullet comment track in an idle state, the plurality of bullet comment tracks configured to display bullet comment elements in an area of the page of playing the video; and
   in response to determining that the plurality of bullet comment tracks comprise the bullet comment track in the idle state, notifying the view layer to perform another data update operation to perform a second rendering operation, wherein a bullet comment element resulting from the second rendering operation and corresponding to the piece of the bullet comment data is configured to be displayed on the page of playing the video.

3. The method of claim 2, wherein the determining, based on the width of the bullet comment element, whether a plurality of bullet comment tracks comprise a bullet comment track in an idle state comprises:
   determining whether a $k^{th}$ bullet comment track is empty, wherein k represents a positive integer, and an initial value of k is 1;
   in response to determining that the $k^{th}$ bullet comment track is empty, determining that the $k^{th}$ bullet comment track is in the idle state;

in response to determining that the $k^{th}$ bullet comment track is not empty, determining a bullet comment speed of the bullet comment element moving on the page of playing the video based on the width of the bullet comment element;

determining, based at least in part on the bullet comment speed of the bullet comment element, whether content of the bullet comment element corresponding to the piece of the bullet comment data collides with content of another bullet comment element displayed in the $k^{th}$ bullet comment track; and in response to determining that the content of the bullet comment element does not collide with the content of another bullet comment element in the $k^{th}$ bullet comment track, determining that the $k^{th}$ bullet comment track is in the idle state; and in response to determining that the content of the bullet comment element collides with the content of another bullet comment element in the $k^{th}$ bullet comment track, determining that the $k^{th}$ bullet comment track is in a congested state.

4. The method of claim 1, wherein the operation subsequent to the $i^{th}$ bullet comment processing operation comprises: an $(i+1)^{th}$ bullet comment processing operation, or an event processing operation based on a user event.

5. The method of claim 4, further comprising:
detecting the operation indication information in response to determining that the user event is received; and
in response to detecting that the operation indication information comprises the second piece of indication information, performing the event processing operation based on the user event.

6. The method of claim 1, further comprising:
in response to determining that the operation indication information comprises the first piece of indication information, detecting the operation indication information at a predetermined time interval until it is detected that the operation indication information is adjusted to the second piece of indication information.

7. The method of claim 1, further comprising:
in response to determining that the plurality pieces of bullet comment data do not comprise the piece of bullet comment data in the to-be-posted state, adjusting the operation indication information to the second piece of indication information.

8. A computer device, comprising a memory, a processor, and computer-readable instructions stored on the memory and executable on the processor, wherein the processor, upon execution of the computer-readable instructions, implements operations comprising:
obtaining a page of playing a video for outputting a video stream;
obtaining a plurality of pieces of bullet comment data associated with the video stream;
performing an $i^{th}$ bullet comment processing operation, wherein the performing an $i^{th}$ bullet comment processing operation further comprises:
adjusting operation indication information to a first piece of indication information, the first piece of indication information indicative of preventing from performing an operation subsequent to the $i^{th}$ bullet comment processing operation, and
traversing the plurality of pieces of bullet comment data and determining whether the plurality of bullet comment data comprise a piece of bullet comment data in a to-be-posted state;

in response to determining that the plurality pieces of bullet comment data comprise the piece of bullet comment data in the to-be-posted state, the method further comprises:
performing a processing operation on the piece of bullet comment data in the to-be-posted state;
determining whether the processing operation on the piece of bullet comment data in the to-be-posted state has been completed; and
in response to determining that the processing operation on the piece of bullet comment data in the to-be-posted state has been completed, adjusting the operation indication information to a second piece of indication information, the second indication information indicative of allowing to perform the operation subsequent to the $i^{th}$ bullet comment processing operation.

9. The computer device of claim 8, wherein the performing a processing operation on the piece of bullet comment data in the to-be-posted state comprises:
adding the piece of bullet comment data to a queue of bullet comments to-be-posted, and notifying a view layer to perform a data update operation to perform a first rendering operation based on the piece of bullet comment data in the to-be-posted state;
obtaining a width of a bullet comment element corresponding to the piece of bullet comment data based on a result of the first rendering operation;
determining, based on the width of the bullet comment element, whether a plurality of bullet comment tracks comprise a bullet comment track in an idle state, the plurality of bullet comment tracks configured to display bullet comments in an area of the page of playing the video; and
in response to determining that the plurality of bullet comment tracks comprise the bullet comment track in the idle state, notifying the view layer to perform another data update operation to perform a second rendering operation, wherein a bullet comment element resulting from the second rendering operation and corresponding to the piece of the bullet comment data is configured to be displayed on the page of playing the video.

10. The computer device of claim 9, wherein the determining, based on the width of the bullet comment element, whether a plurality of bullet comment tracks comprise a bullet comment track in an idle state comprises:
determining whether a $k^{th}$ bullet comment track is empty, wherein k represents a positive integer, and an initial value of k is 1;
in response to determining that the $k^{th}$ bullet comment track is empty, determining that the $k^{th}$ bullet comment track is in the idle state;
in response to determining that the $k^{th}$ bullet comment track is not empty, determining a bullet comment speed of the bullet comment element moving on the page of playing the video based on the width of the bullet comment element;
determining, based at least in part on the bullet comment speed of the bullet comment element, whether content of the bullet comment element corresponding to the piece of the bullet comment data collides with content of another bullet comment element displayed in the $k^{th}$ bullet comment track; and
in response to determining that the content of the bullet comment element does not collide with the content of another bullet comment element in the $k^{th}$ bullet comment track, determining that the $k^{th}$ bullet comment track is in the idle state; and in response to determining that the content of the bullet comment element collides with the content of another bullet comment element in the $k^{th}$ bullet comment track, determining that the $k^{th}$ bullet comment track is in a congested state.

11. The computer device of claim 8, wherein the operation subsequent to the $i^{th}$ bullet comment processing operation comprises: an $(i+1)^{th}$ bullet comment processing operation, or an event processing operation based on a user event.

12. The computer device of claim 11, the operations further comprising:

detecting the operation indication information in response to determining that the user event is received; and in response to detecting that the operation indication information comprises the second piece of indication information, performing the event processing operation based on the user event.

13. The computer device of claim 8, the operations further comprising:

in response to determining that the operation indication information comprises the first piece of indication information, detecting the operation indication information at a predetermined time interval until it is detected that the operation indication information is adjusted to the second piece of indication information.

14. The computer device of claim 8, the operations further comprising:

in response to determining that the plurality pieces of bullet comment data do not comprise the piece of bullet comment data in the to-be-posted state, adjusting the operation indication information to the second piece of indication information.

15. A non-transitory computer-readable storage medium having computer-readable instructions stored thereon, wherein the computer-readable instructions is executable by at least one processor to cause the at least one processor to perform operations comprising:

obtaining a page of playing a video for outputting a video stream;

obtaining a plurality of pieces of bullet comment data associated with the video stream;

performing an $i^{th}$ bullet comment processing operation, wherein the performing an $i^{th}$ bullet comment processing operation further comprises:

adjusting operation indication information to a first piece of indication information, the first piece of indication information indicative of preventing from performing an operation subsequent to the $i^{th}$ bullet comment processing operation, and traversing the plurality of pieces of bullet comment data and determining whether the plurality of bullet comment data comprise a piece of bullet comment data in a to-be-posted state;

in response to determining that the plurality pieces of bullet comment data comprise the piece of bullet comment data in the to-be-posted state, the method further comprises:

performing a processing operation on the piece of bullet comment data in the to-be-posted state;

determining whether the processing operation on the piece of bullet comment data in the to-be-posted state has been completed; and in response to determining that the processing operation on the piece of bullet comment data in the to-be-posted state has been completed, adjusting the operation indication information to a second piece of indication information, the second indication information indicative of allowing to perform the operation subsequent to the $i^{th}$ bullet comment processing operation.

16. The non-transitory computer-readable storage medium of claim 15, wherein the performing a processing operation on the piece of bullet comment data in the to-be-posted state comprises:

adding the piece of bullet comment data to a queue of bullet comments to-be-posted, and notifying a view layer to perform a data update operation to perform a first rendering operation based on the piece of bullet comment data in the to-be-posted state;

obtaining a width of a bullet comment element corresponding to the piece of bullet comment data based on a result of the first rendering operation;

determining, based on the width of the bullet comment element, whether a plurality of bullet comment tracks comprise a bullet comment track in an idle state, the plurality of bullet comment tracks configured to display bullet comments in an area of the page of playing the video; and in response to determining that the plurality of bullet comment tracks comprise the bullet comment track in the idle state, notifying the view layer to perform another data update operation to perform a second rendering operation, wherein a bullet comment element resulting from the second rendering operation and corresponding to the piece of the bullet comment data is configured to be displayed on the page of playing the video.

17. The non-transitory computer-readable storage medium of claim 16, wherein determining, based on the width of the bullet comment element, whether a plurality of bullet comment tracks comprise a bullet comment track in an idle state comprises:

determining whether a $k^{th}$ bullet comment track is empty, wherein k represents a positive integer, and an initial value of k is 1;

in response to determining that the $k^{th}$ bullet comment track is empty, determining that the $k^{th}$ bullet comment track is in the idle state;

in response to determining that the $k^{th}$ bullet comment track is not empty, determining a bullet comment speed of the bullet comment element moving on the page of playing the video based on the width of the bullet comment element;

determining, based at least in part on the bullet comment speed of the bullet comment element, whether content of the bullet comment element corresponding to the piece of the bullet comment data collides with content of another bullet comment element displayed in the $k^{th}$ bullet comment track; and in response to determining that the content of the bullet comment element does not collide with the content of another bullet comment element in the $k^{th}$ bullet comment track, determining that the $k^{th}$ bullet comment track is in the idle state; and in response to determining that the content of the bullet comment element collides with the content of another bullet comment element in the $k^{th}$ bullet comment track, determining that the $k^{th}$ bullet comment track is in a congested state.

18. The non-transitory computer-readable storage medium of claim 15, wherein the operation subsequent to the $i^{th}$ bullet comment processing operation comprises: an $(i+1)^{th}$ bullet comment processing operation, or an event processing operation based on a user event.

19. The non-transitory computer-readable storage medium of claim 18, the operations further comprising:
- detecting the operation indication information in response to determining that the user event is received; and
- in response to detecting that the operation indication information comprises the second piece of indication information, performing the event processing operation based on the user event.

\* \* \* \* \*